United States Patent [19]

Umemoto et al.

[11] Patent Number: 4,690,581
[45] Date of Patent: Sep. 1, 1987

[54] BALL JOINT

[75] Inventors: Yonetsugu Umemoto; Hiroshi Shirasawa, both of Toyota; Muneya Ogo, Nishio; Kazumasa Kinoshita, Nishio; Tetsuo Kondo, Nishio, all of Japan

[73] Assignees: Toyota Jidosha Kabushiki Kaisha; Odai Tekko Kabushiki Kaisha, both of Aichi, Japan

[21] Appl. No.: 732,623

[22] Filed: May 10, 1985

[51] Int. Cl.⁴ .............................................. F16C 11/06
[52] U.S. Cl. ...................................... 403/133; 403/140
[58] Field of Search ............... 403/140, 133, 135, 132, 403/122, 138, 221, 223, 227, 226, 372, 375

[56] References Cited

U.S. PATENT DOCUMENTS

| 2,733,085 | 1/1956 | Latzen | 403/135 |
| 3,038,194 | 6/1962 | Arenson | 403/372 |
| 3,545,797 | 12/1970 | Korecky | 403/140 |
| 3,677,587 | 7/1972 | Schmidt et al. | 403/140 |
| 4,430,016 | 2/1984 | Matsuoka et al. | 403/140 |
| 4,564,307 | 1/1986 | Ito | 403/140 |

FOREIGN PATENT DOCUMENTS

| 2311113 | 3/1973 | Fed. Rep. of Germany | 403/133 |
| 57-19221 | 7/1980 | Japan . | |
| 1013092 | 12/1965 | United Kingdom | 403/138 |
| 2038928 | 7/1980 | United Kingdom | 403/140 |
| 2052620 | 1/1981 | United Kingdom | 403/140 |
| 2052619 | 1/1981 | United Kingdom | 403/133 |

Primary Examiner—Cornelius J. Husar
Assistant Examiner—Peter M. Cuomo
Attorney, Agent, or Firm—Finnegan, Henderson, Farabow, Garrett & Dunner

[57] ABSTRACT

A ball joint is disclosed having a socket, a ball received by the socket and a stud extending outwardly from the ball. A ball seat member is received in the socket and has a soft portion with an inner spherical surface which covers the portion of the ball at the side opposite to the stud. The soft portion is axially compressed by a cap closing an opening in the socket opposite to the stud, while expanding radially outward to be penetrated by linear projections formed in a hard portion of the ball seat member. Further, a gap remains between the soft portion after it has expanded radially outwardly and the inner cylindrical surface of the hard portion of the ball seat member so that the soft portion of the ball seat member contacts the hard portion of the ball seat member only at the linear projections.

3 Claims, 7 Drawing Figures

BALL JOINT

BACKGROUND OF THE INVENTION

1. Field of the Invention

This invention relates to a ball joint comprising a socket, a ball received in the socket, a stud integral with the ball, a synthetic resin ball seat received in the socket to support the ball rotatably about its center and a cap for urging axially the ball seat against the ball to close an opening of the socket at the opposite side to the stud, and more particularly, to a ball joint used for a steering gear or a wheel suspension system of an automobile.

2. Description of the Prior Art

Ball joints are well known which eliminate play and have high rigidity so as to restrain shimmy, flutter or the like produced in a steering gear and wheel suspension system during travelling of an automobile and thereby improve the feel of steering experienced by the driver (e.g., Japanese Utility Model Laid-open No. Sho 57-19221). In such ball joints, a synthetic resin ball seat is given a fastening tolerance compressed by applying an axial compressive load. In this case, if the compressive elastic modulus of the ball seat is too high, the change in the fastening tolerance has a large effect on rotational friction torque so that a soft elastic synthetic resin is selected for the ball seat. Since the soft synthetic resin expands radially by axial compression, the rigidity is not necessarily improved unless its outer diameter is restrained, even if play is eliminated for the axial load. While the rigidity is improved by restraining the outer diameter, an effect similar to one of the ball seat itself having higher elastic modulus is obtained to present a possibility of providing an excessive rotational friction torque.

Even if the rotational friction torque is proper in room temperature, the ball seat expands larger than metal due to the difference of the expansion coefficient between metal and synthetic resin when atmospheric temperature rises, still bringing about a problem that the rotational friction torque will increase. Also, problems are encountered where the ball seat does not slide relative to a spherical surface of the stud, but rotates together with the stud about its axis to provide unstable rotational friction torque which shortens the life of the ball seat itself. To overcome these problems, stoppers are necessary to prevent the ball seat from rotating which have disadvantages in increasing the cost of the assembling operation or the like.

SUMMARY OF THE INVENTION

The present invention overcomes the problems and disadvantages of the prior art by providing a ball joint which incorporates a compressed synthetic resin ball seat formed of soft elastic resin to improve the ridigity of the ball joint provided with the synthetic resin ball seat. In this ball joint, the rotational friction torque is stabilized without being affected by the change of dimension and change in temperature, and the ball seat is prevented from rotation together with the stud.

To achieve the objects and according to the purpose of the present invention, as embodied and broadly described herein, the ball joint of this invention comprises a socket having an inner surface; a ball mounted in the socket; a stud extending from the ball; a synthetic resin ball seat positioned in the socket for supporting the ball for rotation about its center; said socket having an opening at the side opposite to the stud; a cap for urging the ball seat against the ball and closing the opening of the socket at the side opposite to the stud; the ball seat including a first, substantially hard ball seat member having an inner spherical surface and covering a portion of the ball adjacent to the stud and having a cylindrical wall extending axially along the inner surface of the socket to the proximity of the socket opening, said cylindrical wall having an inner surface, and a second, substantially soft ball seat member having an inner spherical surface and an outer surface retained within the cylindrical wall and covering a portion of the ball at the side opposite to the stud; said second ball seat member being compressed by the application of said cap thereby causing radial expansion of said second ball seat member; the first ball seat member having at the inner surface of the cylindrical wall a plurality of linear projections extending axially and having an axial length longer than that of the second ball seat member, said linear projections penetrating the outer surface of the second ball seat member, said second ball seat member having prior to compression by said cap an outer diameter approximately equal to or slightly smaller than the diameter of an imaginary cylinder defined by the ends of the linear projections, and an outer diameter larger than the diameter of the imaginary cylinder but smaller than the inner surface of the cylindrical wall of the first ball seat member when said second ball seat member is compressed axially by the cap, whereby said linear projections penetrate into the outer surface of said second ball seat member.

The accompanying drawings, which are incorporated in and constitute part of this specification, illustrate embodiments of the invention and, together with the description, serve to explain the principles of the invention.

DETAILED DESCRIPTION OF THE PREFERRED EMBODIMENTS

Figure 1:
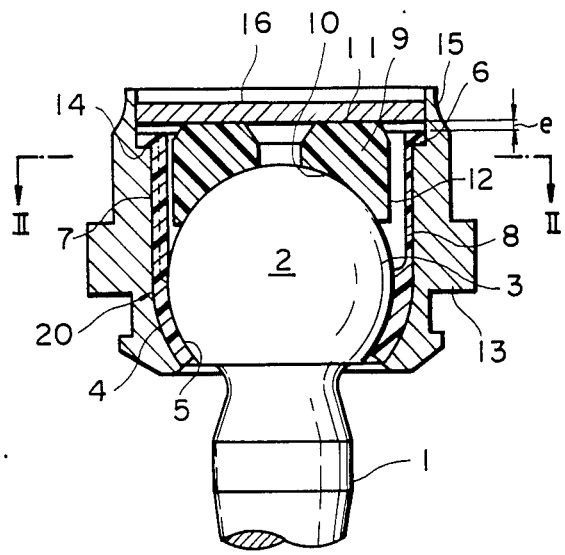
FIG. 1 is a sectional view taken along the line I—I in FIG. 2, showing a first preferred embodiment of a ball joint constructed according to the present invention before it is completely assembled.

Referring to FIG. 1, a ball joint is preferably constituted from a metal ball 2 having a stud 1, a socket 13 similarly made of metal, a synthetic resin ball seat 20 located in the socket 13 for supporting rotatably the ball 2 and a cap 16 for closing an opening of the socket 13 at the opposite side to the stud. The ball seat 20 consists of a lower ball seat 4 formed as a first hard synthetic resin ball seat member having an inner spherical surface 5 adjacent to the stud side portion of the ball 2 and an annular upper ball seat 9 formed as a second shaft synthetic resin ball seat member having an inner spherical surface 10 covering the portion of the ball 2 at the opposite side to the stud. The lower ball seat 4 has a cylindrical wall 8 extending axially along the inner peripheral surface of the socket 13 to the proximity of the cap 16. The cylindrical wall 8 has formed on its inner surface a plurality of linear projections 7 extending axially. The cylindrical wall 8 has on an upper end a flange 6 facing outward which is mounted on an annular shoulder 14 formed on the socket 13.

Figure 2:
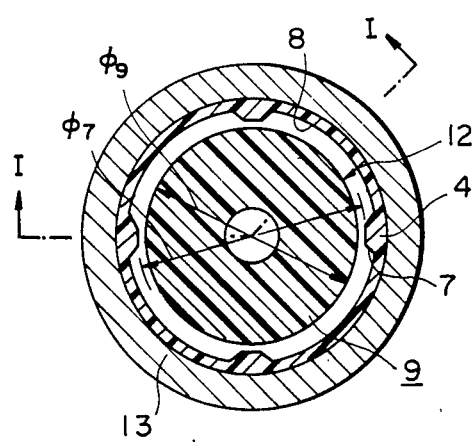
FIG. 2 is a sectional view taken along the line II—II in FIG. 1.
Figure 3:
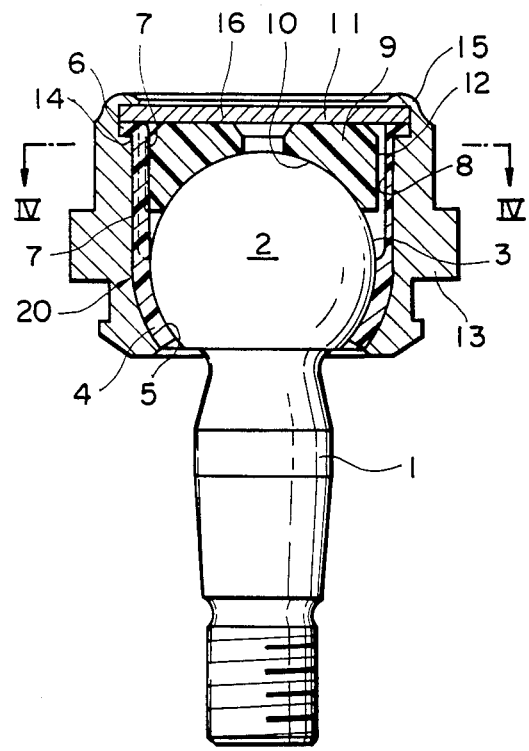
FIGS. 3 and 4 are sectional views corresponding to FIGS. 1 and 2 of the first embodiment after it has been completely assembled.
Figure 4:
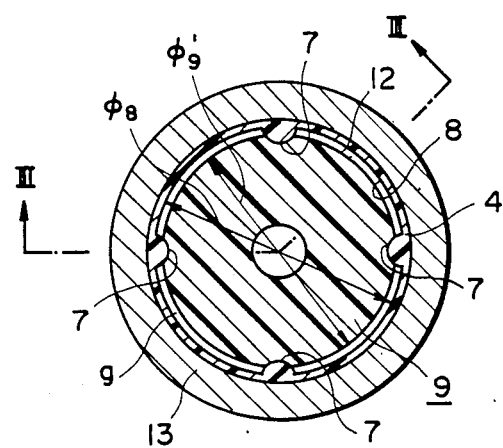

In assembling the ball joint, the opening edge 15 of the socket 13 extending above the shoulder 14 is turned inward (FIG. 3) to urge the cap 16 and the upper ball seat flange 6 against the shoulder 14 of the socket while pressing against an outer end face 11 of the upper ball seat 9 fitted in the cylindrical wall 8 of the lower ball seat 4. The upper ball seat 9 has a cylindrical outer peripheral surface 12, the height of said seat 9 before it is compressed (FIG. 1) being larger than that after it is compressed by an amount equal to a proper fastening tolerance e (FIG. 1). Also, an outer diameter $\phi_9$ of the upper ball seat 9 before it is compressed is approximately equal to or slightly smaller than that $\phi_7$ of an imaginary cylinder contacting the ends of linear projections 7 (FIG. 2), but provides an outer diameter $\phi_9'$ larger than the diameter $\phi_7$ of the imaginary cylinder when the upper ball seat 9 is compressed axially through the fastening tolerance e so as to be radially expanded during such compression. That is, $\phi_9' > \phi_7 \geq \phi_9$. Thus, as shown in FIG. 4, after compression the linear projections 7 on the cylindrical wall 8 of the lower ball seat 4 are embedded in the outer peripheral surface 12 of the soft upper ball seat 9. That is, since the lower and upper ball seats 4, 9 are secured fixedly to the socket 13 at the flange 6 and are also engage circumferentially integrally with each other, these seats do not rotate together with the stud 1 even if the stud 1 rotates about its axis.

Further, since the inner diameter $\phi_8$ of the cylindrical wall 8 of the lower ball seat 4 is made larger than the outer diameter $\phi_9'$ of the upper ball seat 9 after it is compressed, a gap g exists between the cylindrical wall 8 of the lower ball seat 4 and the outer peripheral surface 12 of the upper ball seat 9. In other words, the lower and upper ball seats 4, 9 when they have been incorporated into the completed ball joint do not contact each other except at the linear projections 7. That is, $\phi_8 > \phi_9' > \phi_7 \geq \phi_9$. Further, the dimensions of $\phi_7$, $\phi_8$, $\phi_9$, $\phi_9'$ and e are determined in consideration of the production requirements and the service temperature range of the ball joint.

Figure 5:
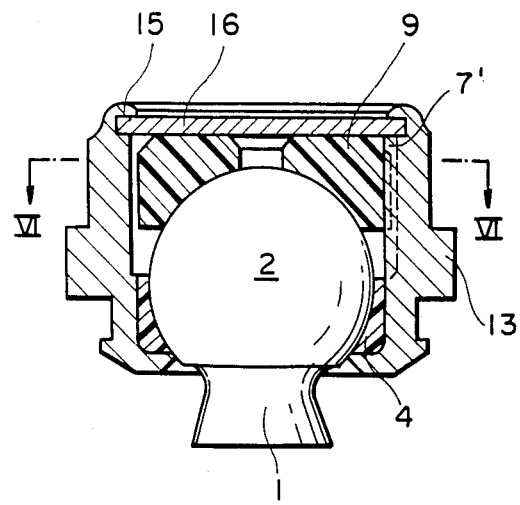
FIGS. 5 and 6 are sectional views, corresponding to FIGS. 3 and 4, of a second preferred embodiment of the invention.
Figure 6:
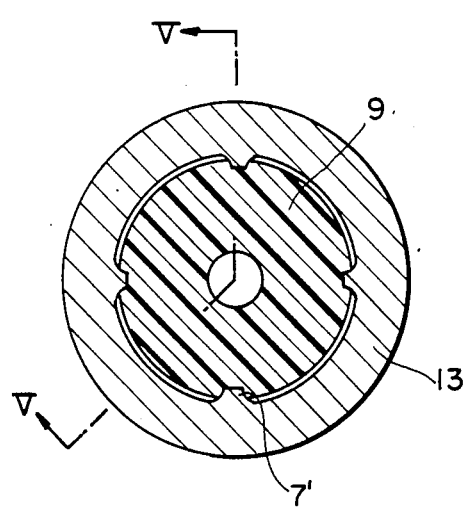
Figure 7:
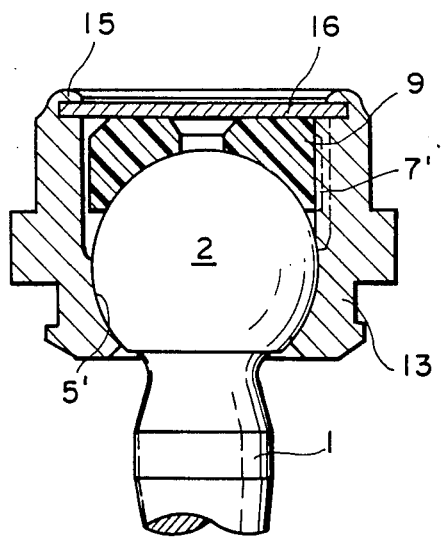
FIG. 7 is a sectional view, corresponding to FIG. 5, of a third preferred embodiment of the invention.

FIGS. 5 and 6 show another embodiment in which the lower ball seat 4 does not have the cylindrical portion of the first embodiment, and the socket 13 is formed on the inner peripheral surface with linear projections 7'. Further, as shown in the third embodiment of FIG. 7, the lower ball seat 4 may be omitted so that the ball 2 may contact directly an inner spherical surface 5' of the socket.

Thus, in the ball joint according to the present invention, since in any case the outer peripheral surface 12 of the upper ball seat 9 and the inner surface of the cylindrical wall 8 of the lower ball seat 4 or the inner surface of the socket 13 do not contact each other over almost the whole periphery, i.e. except at the linear projections 7, 7', the rotational friction torque is stabilized irrespective of the atmospheric temperature, and the upper ball seat 9 is securely prevented from rotation together with the stud without having to use a particular engaging means which needs labor during assembly.

Further, even if, due to the tolerance of production, the depth of the annular shoulder 14 of the socket 13, the thickness of the flange 6 of the lower ball seat 4 and the dimension of the opening edge 15 after being turned inwardly, or the like have variations that provide different fastening tolerance e in the upper ball seat 9, these variations are absorbed by the deformation of that part of the outer peripheral surface 12 of the upper ball seat 9 which does not engage the linear projections 7 or 7' so that change of the rotational friction torque is eliminated.

It will be apparent to those skilled in the art that various modifications and variations may be made in the elements of the invention without departing from the scope or spirit of the invention.

What is claimed is:

1. A ball joint comprising;
    a socket having an inner surface;
    a ball mounted in the socket;
    a stud extending from the ball;
    a synthetic resin ball seat positioned in the socket for supporting the ball for rotation about its center;
    said socket having an opening at the side opposite to the stud;
    a cap for urging the ball seat against the ball and closing the opening of the socket at the side opposite to the stud;
    the ball seat including a first, substantially hard ball seat member having an inner spherical surface and covering a portion of the ball adjacent to the stud and having a cylindrical wall extending axially along the inner surface of the socket to the proximity of the socket opening, said cylindrical wall having an inner surface, and a second, substantially soft ball seat member having an inner spherical surface and an outer surface retained within the cylindrical wall and covering a portion of the ball at the side opposite to the stud, said second ball seat member being compressed by said cap thereby causing radial expansion of said second ball seat member;
    the first ball seat member having at the inner surface of the cylindrical wall a plurality of linear projections extending axially and terminating in ends substantially defining a cylinder having a diameter, and having an axial length longer than that of the second ball seat member, said linear projections penetrating the outer surface of the second ball seat member, said second ball seat member having in an uncompressed state a first outer diameter approximately equal to or slightly smaller than the diameter of the cylinder defined by the ends of the linear projections, and a second outer diameter larger than the diameter of said cylinder but smaller than the inner surface of the cylindrical wall of the first ball seat member when said second ball seat member is compressed axially by the cap, whereby said linear projections penetrate into the outer surface of said second ball seat member.

2. A ball joint as defined in claim 1, wherein said cylindrical wall of the first ball seat member has an outward directed flange and said socket has a corresponding annular shoulder, said flange being fixed to said shoulder by the cap.

3. A ball joint as defined in claim 2, wherein said socket has an open edge, and said cap is fixed to the socket by turning the open edge of the socket against the cap.

* * * * *

UNITED STATES PATENT AND TRADEMARK OFFICE
CERTIFICATE OF CORRECTION

PATENT NO. : 4,690,581

DATED : September 1, 1987

INVENTOR(S) : Umemoto et al.

It is certified that error appears in the above-identified patent and that said Letters Patent is hereby corrected as shown below:

On the face of the patent, please include the priority information as follows:

--[30]   Foreign Application Priority Data

May 11, 1984 [JP] Japan...............93022--

Signed and Sealed this

Twelfth Day of April, 1988

Attest:

DONALD J. QUIGG

*Attesting Officer*     Commissioner of Patents and Trademarks